United States Patent
Strijkers et al.

(10) Patent No.: US 11,979,923 B2
(45) Date of Patent: *May 7, 2024

(54) HANDLING OF CONNECTION SETUP REQUESTS

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Rudolf Strijkers, Zurich (CH); Shuang Zhang, Delft (NL)

(73) Assignees: KONINKLIJKE KPN N.V., Rotterdam (NL); NEDERLANDSE ORGANISATIE VOOR TOEGEPAST- NATUURWETENSCHAPPELIJK ONDERZOEK TNO, 's-Gravenhage (NL)

(*) Notice: Subject to any disclaimer, the term of this patent is extended or adjusted under 35 U.S.C. 154(b) by 0 days.

This patent is subject to a terminal disclaimer.

(21) Appl. No.: 17/573,122

(22) Filed: Jan. 11, 2022

(65) Prior Publication Data

US 2022/0132601 A1 Apr. 28, 2022

Related U.S. Application Data

(63) Continuation of application No. 15/538,182, filed as application No. PCT/EP2015/080174 on Dec. 17, 2015, now Pat. No. 11,259,338.

(30) Foreign Application Priority Data

Dec. 22, 2014 (EP) ..................................... 14199719

(51) Int. Cl.
*H04W 76/10* (2018.01)
*H04W 28/26* (2009.01)
(Continued)

(52) U.S. Cl.
CPC ........... *H04W 76/10* (2018.02); *H04W 28/26* (2013.01); *H04W 72/52* (2023.01); *H04W 76/20* (2018.02); *H04W 88/02* (2013.01)

(58) Field of Classification Search
CPC ..... H04W 72/52; H04W 28/26; H04W 88/02; H04W 76/20
See application file for complete search history.

(56) References Cited

U.S. PATENT DOCUMENTS

| 6,192,248 B1 | 2/2001 | Solondz |
| 6,577,871 B1 | 6/2003 | Budka et al. |

(Continued)

FOREIGN PATENT DOCUMENTS

| EP | 2 491 685 | 8/2012 |
| WO | WO 03/077580 A1 | 9/2003 |

(Continued)

OTHER PUBLICATIONS

International Search Report and Written Opinion of International Searching Authority issued in International Application No. PCT/EP2015/080174, entitled "Handling of Connection Setup Requests," Date of Completion of Search: Mar. 3, 2016.

(Continued)

*Primary Examiner* — Basil Ma
(74) *Attorney, Agent, or Firm* — Hamilton, Brook, Smith & Reynolds, P.C.

(57) ABSTRACT

A software-implemented method for assisting in handling of connection setup requests in a telecommunications network is disclosed. The method includes intercepting a connection setup request from a user equipment (UE) to a control node of a radio access network part of the telecommunications network, determining whether the connection setup request is to be fulfilled based at least on information regarding resource use within a network access point serving the UE, (Continued)

and passing the connection setup request for further processing within the telecommunications network only upon positive determination.

13 Claims, 5 Drawing Sheets

(51) Int. Cl.
    *H04W 72/52*     (2023.01)
    *H04W 76/20*     (2018.01)
    *H04W 88/02*     (2009.01)

(56) References Cited

U.S. PATENT DOCUMENTS

| | | | |
|---|---|---|---|
| 11,259,338 | B2 | 2/2022 | Strijkers et al. |
| 2012/0014332 | A1 | 1/2012 | Smith et al. |
| 2012/0039168 | A1 | 2/2012 | He et al. |
| 2013/0201870 | A1* | 8/2013 | Gupta ............... H04W 76/18 370/254 |
| 2013/0303114 | A1* | 11/2013 | Ahmad ............. H04L 12/1407 455/406 |
| 2014/0057588 | A1* | 2/2014 | Ostrup .............. H04W 28/26 455/404.1 |
| 2014/0086177 | A1 | 3/2014 | Adjakple et al. |
| 2014/0128029 | A1* | 5/2014 | Fong ................. H04W 12/082 455/411 |
| 2015/0304937 | A1 | 10/2015 | Kim et al. |

FOREIGN PATENT DOCUMENTS

| | | |
|---|---|---|
| WO | WO 2012/130312 A1 | 10/2012 |
| WO | 2012/150882 A1 | 11/2012 |

OTHER PUBLICATIONS

Extended Search Report issued in European Application No. 14199719.7 entitled "Handling of Connection Setup Requests," dated Jul. 6, 2015.
Alcatel Lucent—Strategic White Paper, The LTE Network Architecture, a comprehensive tutorial, pp. 1-23 (no date given).
Quality of Service (QoS) and Policy Management in Mobile Data Networks, Validating Service Quality to Ensure Subscriber Quality of Experience, pp. 1-21 (QoE), Dec. 2013.
3$^{rd}$ Generation Partnership Project; Technical Specification Group Services and System Aspects; Study on System Enhancements for User Plane Congestion Management, 3GPP TR 23.705 v13.0.0, (Release 13) pp. 1-61 (Dec. 2014).
3$^{rd}$ Generation Partnership Project; Technical Specification Group Services and System Aspects; Study on Radio Access Network (RAN) Sharing Enhancements, 3GPP TR 22.852 v13.1.0, (Release 13) pp. 1-34 (Sep. 2014).
3$^{rd}$ Generation Partnership Project; Technical Specification Group Services and System Aspects; General Packet Radio Service (GPRS) Enhancements for Evolved Universal Terrestrial Radio Access Network (E-UTRAN) access, 3GPP TR 23.401 v9.16.0, (Release 9) pp. 1-256 (Dec. 2014).
3$^{rd}$ Generation Partnership Project; Technical Specification Group Services and System Aspects; Policy and Charging Control Architecture, 3GPP TR 23.203 v9.14.0, (Release 9) pp. 1-124 (Dec. 2014).
3$^{rd}$ Generation Partnership Project; Technical Specification Group Services and System Aspects; Network Architecture, 3GPP TR 23.002 v13.1.0, (Release 13) pp. 1-109 (Dec. 2014).
3$^{rd}$ Generation Partnership Project; Technical Specification Group Services and System Aspects; Evolved Universal Terrestrial Radio Access (E-UTRA); Physical Channels and Modulation, 3GPP TR 36.211 v12.3.0, (Release 12) pp. 1-124 (Sep. 2014).
3$^{rd}$ Generation Partnership Project; Technical Specification Group Services and System Aspects; Telecommunication Management; Performance Management (PM); Performance Measurements Evolved Packet Core (EPC) Network, 3GPP TR 32.426 v12.0.0, (Release 12) pp. 1-84 (Oct. 2014).
3GPP TS 23.501 v15.12.0, System Architecture for the 5G System (5GS), Stage 2, Release 15 (Dec. 2020).
3GPP TS 23.502 v15.15.0, Procedures for the 5G System (5GS), Stage 2, Release 15 (Sep. 2021).
3GPP TS 24.501 V15.6.0, Non-Access-Stratum (NAS) protocol for 5G System (5GS); Stage 2, Release 15 (Dec. 2019).
3GPP TS 38.331 V15.15.0, NR; Radio Resource Control (RRC) protocol specification, Release 15 (Sep. 2021).
3GPP TS 38.300 V15.13.0, NR; NR and NG-RAN Overall Description; Stage 2, Release 15 (Jun. 2021).
3GPP TS 38.413 V15.13.0, NG-RAN; NG Application Protocol (NGAP), Release 15 (Oct. 2021).
U.S. Patent and Trademark Office—Before the Patent Trial and Appeal Board: *Ericsson Inc.* (Petitioner) v. *Koninklijke KPN N.V.* (Patent Owner); Case IPR2024-00237 U.S. Pat. No. 11,259,338, Declaration of Dr. Zygmunt J. Haas, In Support of Petition for Inter Partes Review of U.S. Pat. No. 11,259,338 (Ericsson Exhibit 1003) (Dec. 1, 2023).
U.S. Patent and Trademark Office—Before the Patent Trial and Appeal Board: *Ericsson Inc. and Telefonaktiebolaget LM Ericsson* (Petitioners) v. *Koninklijke KPN N.V.* (Patent Owner); Case IPR2024-00237 U.S. Pat. No. 11,259,338, Declaration of Craig Bishop (Ericsson Exhibit 1008) (Nov. 30, 2023).
3GPP, 3rd Generation Partnership Project; Technical Specification Group Services and System Aspects; General Packet Radio Service (GPRS) Enhancements for Evolved Universal Terrestrial Radio Access Network (E-UTRAN) Access (Release 12), TS 23.401 v.12.6.0 (Sep. 2014).
U.S. Patent and Trademark Office—Before the Patent Trial and Appeal Board: *Ericsson Inc.* (Petitioner) v. *Koninklijke KPN N.V. and Nederlandse Organisatie Voor Toegepast-Natuurwetenschappelijk Onderzoek TNO* (Patent Owners); Case IPR2024-00237 U.S. Pat. No. 11,259,338, Petition for Inter Partes Review of U.S. Pat. No. 11,259,338 (Dec. 1, 2023).

* cited by examiner

HANDLING OF CONNECTION SETUP REQUESTS

RELATED APPLICATIONS

This application is a continuation of U.S. application Ser. No. 15/538,182, filed Jun. 20, 2017, which is the U.S. National Stage of International Application No. PCT/EP2015/080174, filed Dec. 17, 2015, which designates the U.S., published in English, and claims priority under 35 U.S.C. §§ 119 or 365(c) to European Application No. 14199719.7, filed Dec. 22, 2014. The entire teachings of the above applications are incorporated herein by reference.

FIELD OF INVENTION

The disclosure generally relates to the field of telecommunications networks. In particular, though not necessarily, the disclosure relates to methods, systems, and computer program products for handling, or assisting in handling, of connection setup requests in such networks.

BACKGROUND

Currently, in deployed Long-Term Evolution (LTE) telecommunications networks, whether a connection setup request requesting establishment of a dedicated connection setup for a particular service can be fulfilled is decided by a telecommunications network in a two-step process. In a first step, the network determines whether a subscriber has the right to use the requested service. In a second step, the network determines whether resources are available within the network to fulfil the request. The first step implies that each connection setup request is extensively processed by various nodes within the network, such as e.g. a serving gateway (SGW), a packet gateway (PCG) and a policy and charging rules function (PCRF), all of them located within the core network (CN) part of an LTE network. The second step implies that the eNB serving the terminal, which, for the terminal, is a point of radio access to the telecommunications network, checks whether it has the radio resources to fulfil the request. This is not necessarily the most efficient approach because it is the radio access network (RAN) part of a telecommunications network, in particular the eNB serving the terminal, that typically presents problems in that the RAN part of the network does not have the resources to fulfil the request, which only becomes apparent in the second step.

Furthermore, it would be desirable for network operators to be able to offer to subscribers certain application services, such as e.g., video streaming, gaming, or augmented reality, as premium services. Network operators would then owe it to their subscribes to make sure that premium services receive greater attention and effort from the network than non-premium services, which becomes prominent in case there are not enough resources to fulfil connection setup requests for all of the requested services. However, as telecommunications networks currently make decisions in a process described above, there are no guarantees that a premium service will receive precedence over other services at a specific moment in time. When a connection setup request sent by a subscriber's terminal is 'approved' by participating elements in the CN part of the LTE network, with PCRF being the most critical element as it contains user profile and lists of things that the terminal may and may not do, then it is up to eNB to decide on the request based on whether it is has resources to serve this approved request. It may happen that eNB does not have resources to serve such a request, in which case the request is simply denied/discarded.

One way to account for different priorities of requests is to use different Quality of Signal (QoS) parameters in the network which determine which requests are served first. While QoS parameters may indicate that certain traffic has priority over other types of traffic, when the network is loaded (i.e. it has limited or not at all resources remaining for serving additional requests), the use of QoS parameters has no significant impact and does not give guarantees that premium services will be provided.

Similar problems are encountered in telecommunications networks implementing radio access technologies (RATs) other than LTE.

What is needed in the art is an approach to handling connection setup requests that can improve on or eliminate at least some of these drawbacks.

SUMMARY

To reduce or eliminate at least some of the problems discussed above, according to one aspect of an embodiment of the present invention, a software-implemented method for an entity (i.e. a functional network component) within or associated with a telecommunications network to assist in handling of connection setup requests is disclosed. The method includes intercepting a connection setup request from (i.e., sent by) a user equipment (UE) to (i.e., destined for) a control node of a RAN part of the telecommunications network. Such a control node could be e.g. a mobile management entity (MME) in an LTE network or an analogous entity in networks of other RATs. The method also includes determining whether the intercepted connection setup request is to be fulfilled (i.e., validating, or approving, the request) based at least on information regarding resource use within a network access point (NAP) serving the UE. Such a NAP could be e.g. an eNB in an LTE network or an analogous entity in networks of other RATs. The method further includes passing the intercepted connection setup request for further processing within the telecommunications network only upon positive determination. Upon negative determination, the intercepted connection setup request is not passed for further processing within the telecommunications network. In such a case, the request may e.g. be ignored, discarded, or stored for processing at a later point in time (when a repeated determination of whether the request is to be fulfilled is positive).

As used herein, the term "UE" is used to describe any device or a terminal, preferably mobile, not necessarily operated by a human user (e.g. a machine-type communication device), that may need to connect to the telecommunications network and transfer data. Such devices or terminals are also sometimes referred to as "Mobile Stations" (MSs), "terminals", "cellular devices", or simply as "users".

Although, in the following, embodiments of the present invention will be explained with reference to an LTE network, the teachings described herein are equally applicable to other types of RAT, as well as to networks other than those defined by 3d Generation Partnership Project (3GPP), e.g. WiMAX or CDMA2000.

Embodiments of the present invention are based on the insight that RAN part of a telecommunications network is the part most prone to congestion and that, therefore, filtering of which connection setup requests may go through and which requests may not go through can already be done at the MME level, prior to evaluating in the CN part (by the PCRF) whether a subscriber has a right to use a particular requested service. In this manner, if e.g. a UE requests connection setup for a particular service but the network will not be able to fulfil the request because there are no available resources at the eNB serving the UE, a decision on that can be made already when an incoming connection setup request from the UE, via the serving eNB, to the MME is intercepted. When the decision is negative (i.e. there are no resources available at that time), the connection setup request is put on hold for re-evaluation later or discarded, which effectively prevents further processing of this request within the network (i.e. the request is not passed from the MME to the SGW, then from the SGW to the PGW, and is not checked at the PCRF).

In an embodiment, the determination of whether the intercepted connection setup request is to be fulfilled may further be based on one or more agreements with one or more service providers regarding resource capacity in an access network part, e.g. in RAN part, of the telecommunications network. Such an embodiment allows a network operator to ensure that service providers get resources within the telecommunications network in accordance with their respective agreements or lack thereof, which, in turn, allows labeling and treating certain services as "premium services". In one further embodiment, the one or more agreements may include reservation, at the NAP serving the UE, of a predefined resource capacity for connection setup requests for one or more predefined services. Such an embodiment allows allocating a particular amount of resources exclusively for the premium services. In one embodiment, the predefined resource capacity may be set as a percentage of the total resource capacity of the NAP, which allows defining the amount of resources reserved for the premium services as a percentage of the total amount of resources. In another embodiment, the predefined resource capacity may be set as a predefined amount of the total resource capacity of the NAP, the predefined amount being less than the total resource capacity of the NAP, which allows defining the amount of resources reserved for the premium services in absolute value terms. In yet another embodiment, the predefined resource capacity may be dynamically adjusted.

In an embodiment, the method may further include steps of identifying, from the intercepted connection setup request, a service for which a connection setup is requested, confirming that the identified service is not one of the one or more predefined services, and establishing that the intercepted connection setup request is to be fulfilled if, and preferably only if, at the NAP serving the UE, there is sufficient unused resource capacity that is not reserved for the connection setup requests for the one or more predefined services. In this manner, connection requests for non-premium services are only validated when the serving NAP has sufficient resource capacity for fulfilling the request that has not been assigned for the premium services. On the other hand, connection requests for premium services may be validated even when the serving NAP does not have sufficient resource capacity that has not been assigned for the premium services as long as the NAP has sufficient resource capacity that has been assigned for the premium services. A method of this embodiment may also, optionally, include the step of confirming that the identified service is not one of one or more additional predefined services, such as e.g. emergency calls. Such a further embodiment may be advantageous in that it would still allow the requests for some additional predefined services such as emergency calls to go through as long as requests for premium services can go through.

In an embodiment, the method may further include the step of providing an indication to the UE of whether the intercepted connection setup request was determined to be fulfilled. In case of a positive determination, such an indication could be implicit in that the UE may just be able to set up the desired connection. In case of a negative determination, such an embodiment provides a possibility for the network to inform the UE that the intercepted connection setup request has been or will be discarded, ignored, or put on hold.

According to another aspect of the present invention, a data structure is disclosed. The data structure includes at least an indication of a resource capacity of a NAP reserved for connection setup requests for one or more predefined services, an indication of an amount of resources currently used by the NAP for the one or more predefined services, and an indication of an amount of resources currently used by the NAP for services that do not belong to the one or more predefined services. Such a data structure could be stored, e.g. in a database form, on/in a, preferably non-transitory, computer-readable storage medium.

Yet another aspect of the present invention relates to a node comprising a computer readable storage medium having computer readable program code embodied therewith, and a processor, preferably a microprocessor, coupled to the computer readable storage medium, where responsive to executing the computer readable program code, the processor is configured to perform executable operations carrying out one or more of the method steps described herein. In an embodiment, such a node could be an MME of the telecommunications network. In an embodiment, such a node could be communicatively connected to the computer-readable storage medium and/or the database described above, and the information regarding resource use within the NAP serving the UE could comprise at least a portion of information stored in the computer-readable storage medium and/or the database.

The disclosure may also relate to a computer program or a suite of computer programs, preferably implemented on computer-readable non-transitory storage medium. The computer program may comprise software code portions configured for, when run on a computer, executing the method steps according to any of the methods described in the present disclosure.

Another aspect of the present invention relates to a system comprising the earlier described node and computer-readable, preferably non-transitory, storage medium.

Since embodiments of the method described herein are performed on the side of the RAN part of a telecommunications network in terms of deciding whether or not to fulfill the request based on the capacity in the RAN, a functional network component performing embodiments of the method described herein will be referred to in the following as a "RAN Controller". As will be appreciated by one skilled in the art, aspects of the present invention, in particular the functionality of the RAN controller described herein, may be embodied as a system, a method or a computer program product. Accordingly, aspects of the present invention may take the faun of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The disclosure will further be illustrated with reference to the attached drawings, Which schematically show embodiments according to the disclosure. It will be understood that the disclosure is not in any way restricted to these specific embodiments. Moreover, combinations of any of the embodiments and limitations are envisioned by the disclosure.

BRIEF DESCRIPTION OF THE DRAWINGS

Aspects of the invention will be explained in greater detail by reference to exemplary embodiments shown in the drawings, in which.

DETAILED DESCRIPTION

Figure 1:
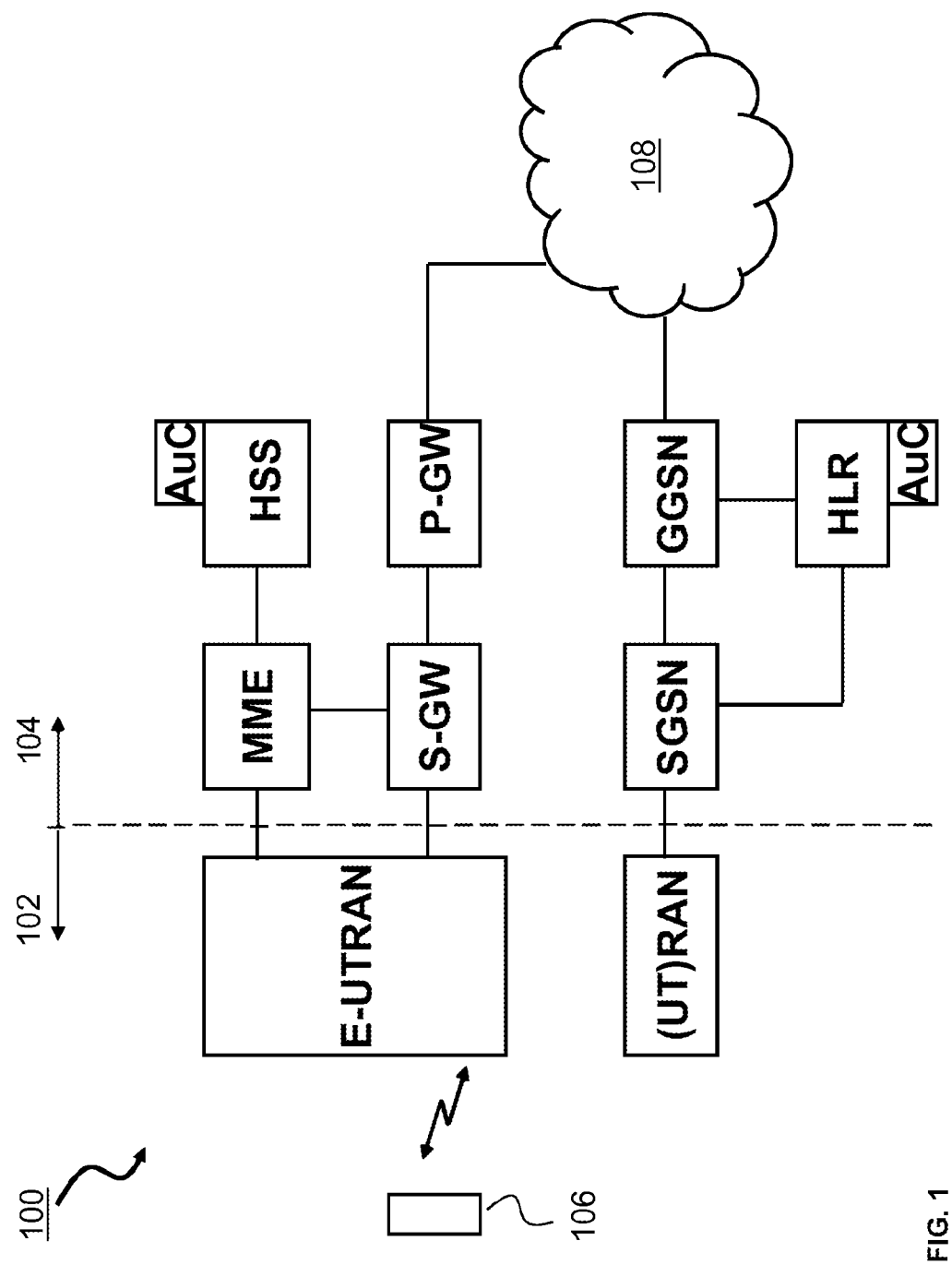
FIG. 1 shows a schematic illustration of a telecommunications system.

FIG. 1 shows a schematic illustration of a telecommunications system 100. The telecommunications system 100 comprises a radio access network 102 (also indicated as E-UTRAN UTRAN or (UT)RAN in FIG. 1) and a core network 104 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network.

For a GSM/GPRS telecommunications network (i.e., a 2G/2.5G telecommunications network), a radio access network 102 comprises a plurality of base stations (BTSs) and one or more Base Station Controllers (BSCs), not shown individually in FIG. 1. The core network 104 comprises a Gateway GPRS Support Node (GGSN), a Serving GPRS Support Node (SGSN, for GPRS) or Mobile Switching Centre (MSC, for GSM, not shown in FIG. 1), and a Home Location Register (HLR) combined with an Authentication Centre (AuC). The HLR contains subscription information for mobile devices 106 (sometimes referred to as "user equipment" (UE) or user devices) and the AuC contains a shared secret key K to be used for authentication and key agreement (AKA) procedures.

For a UMTS radio access network (UTRAN) (i.e., a 3G telecommunications network), the radio access network 102 comprises a Radio Network Controller (RNC) connected to a plurality of NodeBs, also not shown. In the core network 104, the GGSN and the SGSN/MSC are conventionally connected to the HLR/AuC that contains subscription information and shared secret keys K of the mobile devices 106.

The upper branch in FIG. 1 represents a next generation telecommunications network, commonly indicated as Long Term Evolution (LTE) system or Evolved Packet System (EPS) (i.e., a 4G telecommunications network). In such a network, the radio access network 102, indicated as E-UTRAN, comprises evolved. NodeBs (eNodeBs or eNBs) providing wireless access for the mobile devices 106. The core network 104 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures. Further information of the general architecture of an EPS network can be found in 3GPP TS 23.401.

For GPRS, UMTS and LTE telecommunications network, the core network 104 is generally connected, using e.g. a gateway (e.g. the P-GW), to a further network 108 which could be any external packet switched network such as e.g. Internet or a dedicated network to provide connectivity between different operators.

Of course, architectures other than defined by 3GGP, e.g. WiMAX and/or CDMA2000, can also be used within the context of the present disclosure and this does not preclude future architectures such as 5G.

Figure 2:
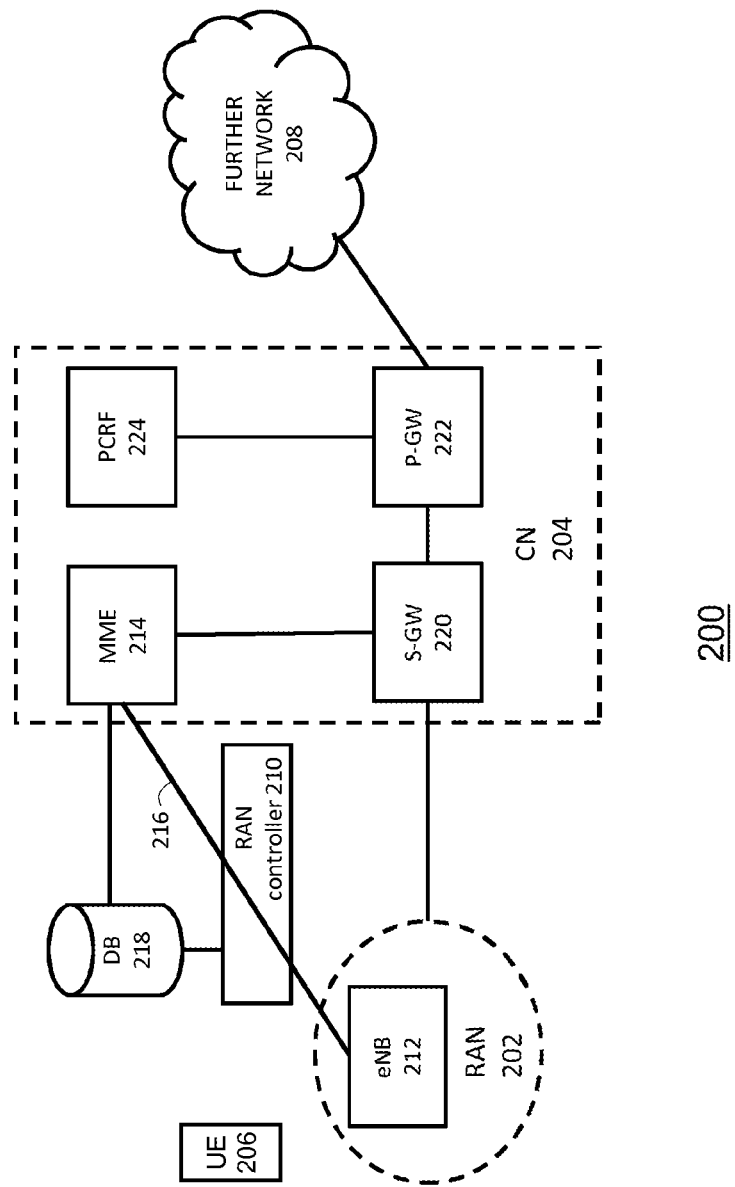
FIG. 2 provides a schematic illustration of a telecommunications network comprising a RAN controller for assisting in handling of connection setup requests, according to one embodiment of the present invention.

FIG. 2 provides a schematic illustration of a telecommunications network 200 comprising a RAN controller 210 for assisting in handling of connection setup requests, according to one embodiment of the present invention. The network 200 illustrates elements of an LTE telecommunications network, however, as previously described herein, the teachings are applicable to other RATS as well by substituting the LTE elements of the network 200 with analogous elements of other RATs (e.g. substituting eNB with a base station, MME—with SGSN, etc. for (UT)RAN).

Similar to the telecommunications networks illustrated in FIG. 1, the network 200 comprises a RAN part 202 and a CN part 204 (indicated with dashed lines), analogous to the RAN part 102 and the CN part 104 of FIG. 1. A UE 206 is also illustrated in FIG. 2, similar to the UE 106 of FIG. 1. The UE 206 may connect to the network 200. The telecommunications network 200 may also connect to a further network 208, such as e.g. a packet network such as Internet. The further network 208 is analogous to the further network 108 shown in FIG. 1.

FIG. 2 further illustrates the RAN controller 210, which may be viewed as a logical entity configured to intercept connection setup requests between an eNB 212 and an MME 214 over a communication path 216 between these two entities. The eNB 212 receives such communications requests from UEs that it serves, such as e.g. the UE 206. As described in greater detail below, the RAN controller 210 is configured to validate the intercepted requests (i.e. to determine whether or not the requests are to be fulfilled). In order to validate the intercepted requests, the RAN controller 210 may access information stored in a database 218. The MME 214 may also be communicatively connected with the database 218, e.g. in order to supply and update information stored in the database.

Those requests that are validated by the RAN controller 210 and are determined by the RAN controller 210 to be fulfilled are passed for further processing within the CN part 204 of the telecommunications network 200, namely the requests are passed from the MME 214 to a S-GW 220, to a P-GW 222, and to a PCRF 224.

Persons skilled in the art will recognize that while the various elements are shown in FIG. 2 as separate elements, in other embodiments their functionality could be implemented in lesser number of individual elements or distributed over a larger number of components.

Figure 3:
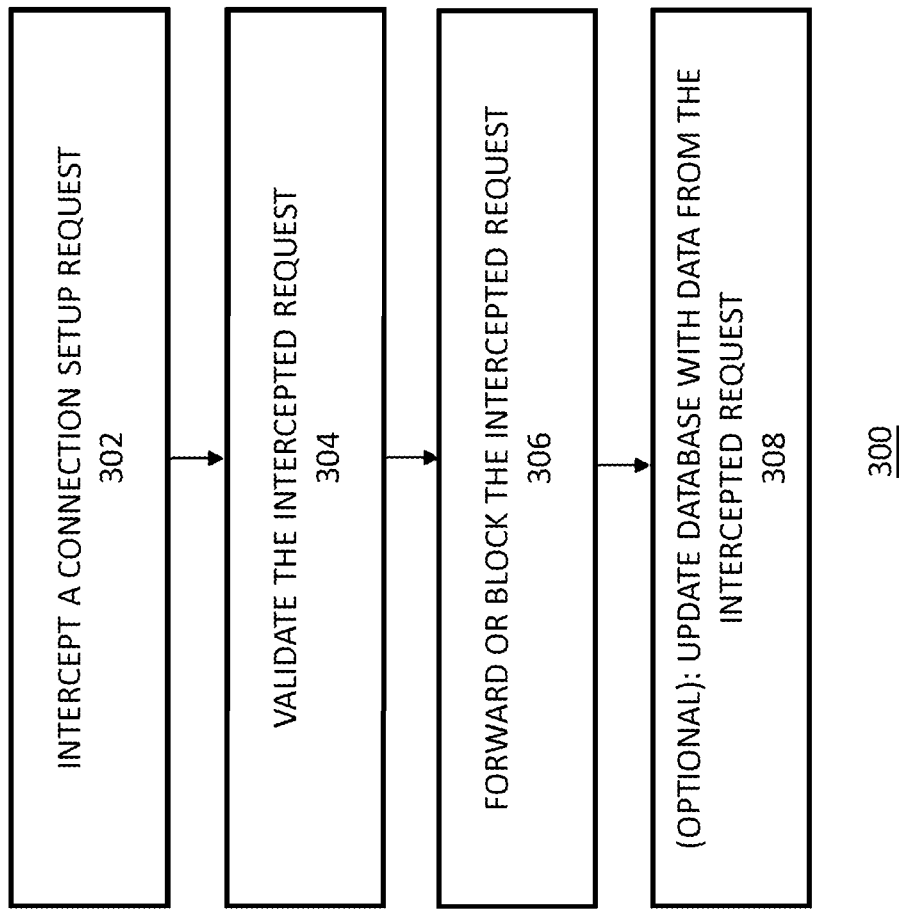
FIG. 3 provides a flow diagram of method steps for the RAN controller to assist in handling of connection setup requests, according to one embodiment of the present invention.
Figure 5:
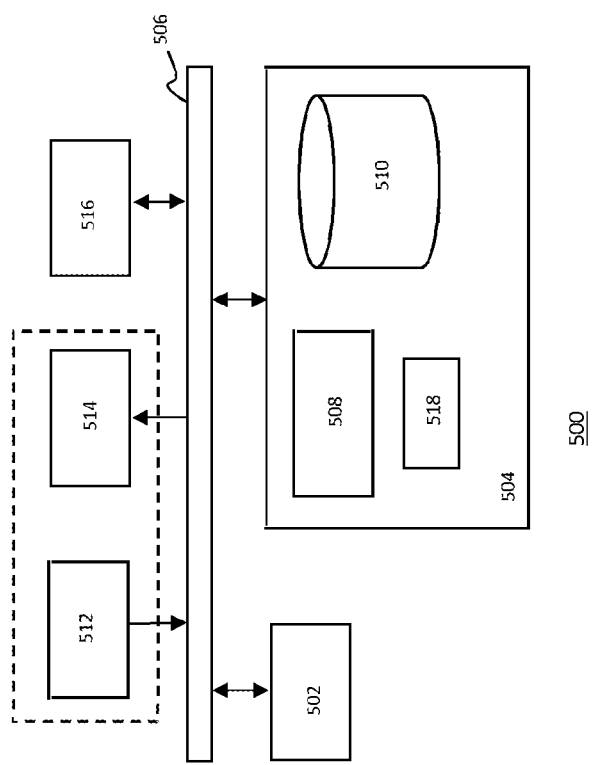
FIG. 5 shows a block diagram illustrating an exemplary data processing system that may be used to carry out methods described herein, according to one embodiment of the present invention.

FIG. 3 provides a flow diagram 300 of method steps for the RAN controller 210 to assist in handling of connection setup requests, according to one embodiment of the present invention. The method 300 could be performed by any kind of a data processing system that includes at least a processor configured to carry out the method steps 300. An example of such a data processing system is illustrated in FIG. 5. While the method 300 is described in conjunction with FIG. 2 and, in particular, with reference to an LTE network, persons skilled in the art will recognize that any system configured to perform the method steps, in any order, in any type of a telecommunications network, is within the scope of the present invention.

The method 300 may begin with step 302, where the RAN controller 210 intercepts a connection request from the UE 206, via the NAP serving the UE (i.e., in this example—the eNB 212), to the control node of the RAN part of the telecommunications network (the control node being in this example the MME 214). In one embodiment, the RAN controller 210 is able to intercept the request because it is implemented as a part of the MME 214 and is configured to intercept and process the request before the conventional processing of the request by the MME 214 and further nodes within the CN part 204 begins. For example, the UE 206 that wants to attach to the network will send an ATTACH REQUEST, e.g. in accordance with 3GPP 24.301, section 8.2.4, which will be passed from the eNB 212 to the MME 214, where the RAN controller 210 could intercept the request.

In step 304, the RAN controller 210 analyzes the intercepted request in order to validate it, i.e. to determine whether the request is to be fulfilled.

First, the RAN controller 210 may determine or estimate the amount of capacity being requested, in terms of the resource use within the serving NAP. In one embodiment, the RAN controller 210 may extract this information from the Traffic Flow Template (TFT) (e.g. in accordance with section 9.9.4.16 in 3GPP 24.301 and section 10.5.6.12 in 3GPP 24.008) included within the intercepted request, specifying uplink and downlink packet filters that will be used for the connection setup. Since these values will be enforced by network, they can be used in estimating the capacity that serving NAP will be providing.

Next, the RAN controller 210 will determine whether the serving NAP is able to provide the requested capacity. In order to do that, the RAN controller 210 has access to the database 218. The database 218 is configured to store the actual (i.e., current) information on the load of the serving NAP. In an embodiment, information stored in the database 218 may be tracked per NAP, possibly per cell within each NAP, for every NAP connected to the MME. By determining whether the amount of requested capacity is less than the amount of total unused capacity in the serving NAP, the RAN controller is able to establish whether or not to pass the intercepted request for further processing by the CN part 204.

In a preferred embodiment, further checks are implemented, allowing finer granularity in differentiating between requests. In particular, the database 218 may store the actual information on the load of the serving NAP specified as the current load of the serving NAP caused by services of different categories—e.g. caused by one or more predefined services (referred to hereafter as "premium services"), and the current load of the serving NAP caused by other, i.e. non-premium, services. In an embodiment where there is a number of different premium services, the database 218 may store load on a per-premium service basis (i.e., for each premium service there may be a separate counter which tracks its load). In an alternative or additional embodiment where there is a number of different premium services, the database 218 may be configured to store load on a per-OTT service provider basis (i.e., for each OTT service provider there may be a counter which tracks the load of the requests for the OTT).

One way to use the load information stored in the database 218 for premium vs non-premium services comprises defining conditions for the RAN controller 210 to apply in deciding whether to fulfil a request. In an embodiment, the information defining the conditions could also be stored in the database 218. Alternatively, this information could be stored within the RAN controller 210 itself.

For example, in an embodiment, information defining the conditions could include the total expected capacity of a NAP, e.g. as provided by an operator and one or more limits of how much of this total capacity a particular premium service may consume, e.g. also defined by an operator in view of the agreements between the operator and the provider of the premium service. In various embodiments, such limits could be defined as a percentage of the total NAP capacity or as an absolute amount of the resources of a given NAP, which cannot be larger than the totally available capacity of that NAP. Such limits could be defined for every premium service an operator may or intends to provide, in accordance with respective agreements with the premium service providers, as long as the total sum of resources which is intended for premium services on a given NAP does not exceed the total NAP capacity. Similar to how, as described above, load information could be stored in the database 218 on a per-premium service basis and/or on a per-Over-The-Top (OTT) service provider basis, conditions may be defined on a per-premium service basis and/or on a per-OTT service provider basis as well.

In an embodiment, conditions applied to one or more premium services or non-premium services may be dynamically adjusted. In one example, the amount of resources reserved for the premium services could be dynamically adjusted based on a schedule (i.e. adjusted depending on the time of the day, day in the week, etc.). In another example, the amount of resources reserved for the premium services could be dynamically adjusted when triggered by one or more of predefined events (e.g. in case of a natural disaster happening, a football game lasting longer than expected, etc.).

As a person skilled in the art will recognize, there are many ways to fill/maintain information in the database 218, all of which are within the scope of the present invention. For example, in one embodiment, the NAP(s) may be configured to the provide information regarding resource usage to the database 218. In another embodiment, information within the database 218 may be kept current by an entity, e.g. the RAN controller 210 or the MME 214, tracking amount of resources that have been fulfilled. In such an embodiment, the entity doing the tracking may be configured to also take into account changes to connection setup, e.g. by obtaining indications of modify connection setup requests that have been approved. When a UE then sends a connection setup release message, information in the database 218 is updated accordingly. This kind of "bookkeeping" may be performed for both premium and non-premium services.

Figure 4:
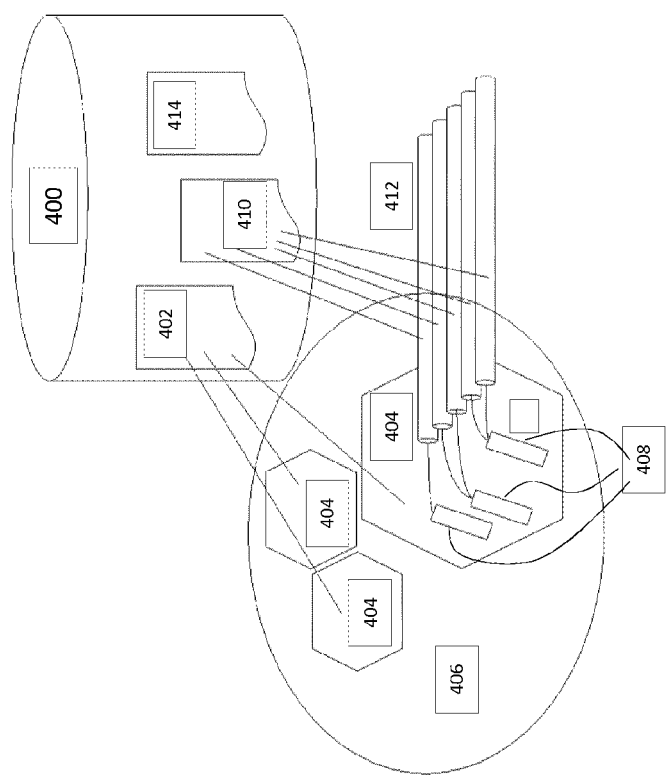
FIG. 4 provides a schematic illustration of a database that could be used in combination with the RAN controller to assist in handling of connection setup requests, according to one embodiment of the present invention.

An exemplary illustration of the database 218 is provided in FIG. 4, the database shown as a database 400. As shown in FIG. 4, part 402 of the database 400 could maintain data about NAPs 404 or different cells therein, tracking areas 406, active users 408 and Physical Resource Blocks (PRB) information per NAP, and other data relevant for the decision process carried out by the RAN controller 210. As also shown in FIG. 4, part 410 of the database 400 could maintain data about the active connections 412, e.g. the active EPS bearers in the EPS. From this data, the net capacity of a specific NAP/cell in the EPS can be calculated. In addition, part 414 of the database 400 could maintain data about resource reservations for specific services according to operator agreements.

In an embodiment, the RAN controller 210 may determine whether the intercepted request is a request for the premium services or not based on the TFT described above.

In another embodiment, an operator may choose to provide premium services via a separate Access Point Name (APN), as e.g. described in 3GPP 24.008, section 10.5.6.1, or via a separate LLC Service Access Point, as e.g. described in 3GPP 24.008, section 10.5.6.9. In such an embodiment, the RAN controller 210 can determine whether the intercepted request is a request for the premium services or not by identifying the APN name or LLC Service Access Point name within the intercepted request.

Once the RAN controller 210 determined the category of the intercepted request in one of the manners described above, it will evaluate the request, which, in an exemplary embodiment could be done in the following manner. The RAN controller 210 would access the database 218 regarding the current load of the serving NAP for non-premium services and/or the current load of the NAP for premium services. The RAN controller 210 may then be configured to fulfil the request if the current load of the serving NAP for non-premium services is such that there is sufficient unused capacity to fulfil the request, independent of Whether the request is for premium or non-premium services. If, however, the current load of the serving NAP for non-premium services is such that there is not sufficient unused capacity to fulfil the request, the RAN controller 210 will only fulfil the request if the request is for one of the premium services and the current load of the serving NAP for premium services is such that there is sufficient unused capacity to fulfil the request.

In a further embodiment, there may be yet another category of requests, such as e.g. emergency requests, which are treated differently from requests of other categories. For example, the RAN controller could determine whether the request is an emergency request or not from the intercepted ATTACH REQUEST sent by the UE, based on Evolved Packet System (EPS) attach type parameter within the request. If the request is an emergency request, the RAN controller 210 may be configured to always fulfil the intercepted request for passing through to be further processed in the CN part 204.

In step 306, if the RAN controller 210 determined in step 304 that the request is to be fulfilled, then the RAN controller 210 passes the request for being processed further in the CN part 204 of the telecommunications network as is known in prior art. In particular, the request may be passed from the MME 214 to the S-GW 220 and to the P-GW 222 to reach the PCRF 224 which will determine whether the user and/or the device have the necessary rights for the request to be fulfilled. If, however, the outcome of the validation in step 304 was negative, the RAN controller 210 does not pass the request to the CN part 204. In this case, the RAN controller 210 may e.g. discard the request, ignore the request, or store it for further re-evaluation at some later point in time. In an embodiment, the request may fail when one of timers associated with fulfilling the request, as known in the art, expire.

In an embodiment, the method may also include a step of providing an indication, either explicit or implicit, to the UE 206 of whether the connection setup request was determined to be fulfilled. When the request was determined to be fulfilled, such indication may be implicit in that the requested connection will be established. When the request was not determined to be fulfilled, the RAN controller 210 may be configured to provide an indication of that, possibly with further indication as to what the RAN controller 210 will do with the request (e.g., discard, ignore, or store for further re-evaluation), to the UE 206.

In an embodiment, in step 308, the RAN controller 210 may, optionally, update the database 218 with the data from the intercepted request. Such an embodiment may be particularly advantageous when the request has been or about to be fulfilled and when the information on resource usage is kept current in the database 218 by means of bookkeeping described above.

FIG. 5 depicts a block diagram illustrating an exemplary data processing system that may be used in a network as described with reference to FIG. 2, in particular as the RAN controller 210.

As shown in FIG. 5, the data processing system 500 may include at least one processor 502 coupled to memory elements 504 through a system bus 506. As such, the data processing system may store program code within memory elements 504. Further, the processor 502 may execute the program code accessed from the memory elements 504 via a system bus 506. In one aspect, the data processing system may be implemented as a computer that is suitable for storing and/or executing program code. It should be appreciated, however, that the data processing system 500 may be implemented in the form of any system including a processor and a memory that is capable of performing the functions described within this specification.

The memory elements 504 may include one or more physical memory devices such as, for example, local memory 508 and one or more bulk storage devices 510. The local memory may refer to random access memory or other non-persistent memory device(s) generally used during actual execution of the program code. A bulk storage device may be implemented as a hard drive or other persistent data storage device. The processing system 500 may also include one or more cache memories (not shown) that provide temporary storage of at least some program code in order to reduce the number of times program code must be retrieved from the bulk storage device 510 during execution.

Input/output (I/O) devices depicted as an input device 512 and an output device 514 optionally can be coupled to the data processing system. Examples of input devices may include, but are not limited to, a keyboard, a pointing device such as a mouse, or the like. Examples of output devices may include, but are not limited to, a monitor or a display, speakers, or the like. Input and/or output devices may be coupled to the data processing system either directly or through intervening 110 controllers.

In an embodiment, the input and the output devices may be implemented as a combined input/output device (illustrated in FIG. 5 with a dashed line surrounding the input device 512 and the output device 514). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 516 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 500, and a data transmitter for transmitting data from the data processing system 500 to said systems, devices and/or networks. Modems, cable modems, and Ethernet cards are examples of different types of network adapter that may be used with the data processing system 500.

As pictured in FIG. 5, the memory elements 504 may store an application 518. In various embodiments, the application 518 may be stored in the local memory 508, the one or more bulk storage devices 510, or apart from the local memory and the bulk storage devices. It should be appreciated that the data processing system 500 may further execute an operating system (not shown in FIG. 5) that can facilitate execution of the application 518. The application 518, being implemented in the form of executable program code, can be executed by the data processing system 500, e.g., by the processor 502. Responsive to executing the application, the data processing system 500 may be configured to perform one or more operations or method steps described herein.

Persons skilled in the art will recognize that while the elements 502-518 are shown in FIG. 5 as separate elements, in other embodiments their functionality could be implemented in lesser number of individual elements or distributed over a larger number of components.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 502 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A method for assisting in handling of connection setup requests in a telecommunications network, the method comprising:
    intercepting a connection setup request from a user equipment (UE) to a control node of a radio access network (RAN) part of the telecommunications network;
    determining whether the connection setup request is to be fulfilled based at least on information regarding resource use within a network access point (NAP) serving the UE;
    if, at the NAP serving the UE, there is sufficient unused resource capacity that is not reserved for connection setup requests for one or more premium services, determining that the connection setup request is to be fulfilled; and
    passing the connection setup request for further processing within the telecommunications network only if it is determined that the connection request is to be fulfilled.

2. The method according to claim 1, wherein the determination of whether the connection setup request is to be fulfilled is further based on one or more agreements with one or more service providers regarding resource capacity in an access network part of the telecommunications network.

3. The method according to claim 2, wherein the one or more agreements comprise reservation, at the NAP serving the UE, of a predefined resource capacity for connection setup requests for one or more predefined services.

4. The method according to claim 3, wherein the predefined resource capacity is set as a percentage of the total resource capacity of the NAP.

5. The method according to claim 3, wherein the predefined resource capacity is set as a predefined amount of the total resource capacity of the NAP, the predefined amount being less than the total resource capacity of the NAP.

6. The method according to claim 3, wherein the predefined resource capacity is dynamically adjusted.

7. The method according to claim 3, further comprising:
    identifying, from the connection setup request, a service for which a connection setup is requested;
    determining that the identified service is not one of the one or more predefined services and, optionally, determining that the identified service is not one of one or more additional predefined services.

8. The method according to claim 1, further comprising providing an indication to the UE of whether the connection setup request was determined to be fulfilled.

9. A computer program product stored on a computer-readable non-transitory storage medium, the computer program product comprising software code portions configured for, when executed in a computer, carrying out the method according to claim 1.

10. A node comprising:
    a computer readable storage medium having computer readable program code embodied therewith, and
    a processor coupled to the computer readable storage medium, wherein responsive to executing the computer readable program code, the processor is configured to perform executable operations comprising:
    intercepting a connection setup request from a user equipment (UE) to a control node of a radio access network (RAN) part of a telecommunications network;

determining whether the connection setup request is to be fulfilled based at least on information regarding resource use within a network access point (NAP) serving the UE;

if, at the NAP serving the UE, there is sufficient unused resource capacity that is not reserved for connection setup requests for one or more premium services, determining that the connection setup request is to be fulfilled; and passing the connection setup request for further processing within the telecommunications network only if it is determined that the connection request is to be fulfilled.

11. The node according to claim 10, wherein the node is a mobile management entity (MME) of the telecommunications network.

12. The node according to claim 10, wherein:

the node is communicatively connected to a computer-readable storage medium storing a data structure comprising at least:

an indication of a resource capacity of a network access point (NAP) reserved for connection setup requests for one or more predefined services;

an indication of an amount of resources currently used by the NAP for the one or more predefined services;

an indication of an amount of resources currently used by the NAP for services that do not belong to the one or more predefined services; and the information regarding resource use within the NAP serving the UE comprises at least a portion of information stored on the computer-readable storage medium.

13. A system comprising:

the node according to claim 10, and a computer-readable storage medium storing a data structure comprising at least:

an indication of a resource capacity of a network access point (NAP) reserved for connection setup requests for one or more predefined services;

an indication of an amount of resources currently used by the NAP for the one or more predefined services; and an indication of an amount of resources currently used by the NAP for services that do not belong to the one or more predefined services.

\* \* \* \* \*